Figure 1:
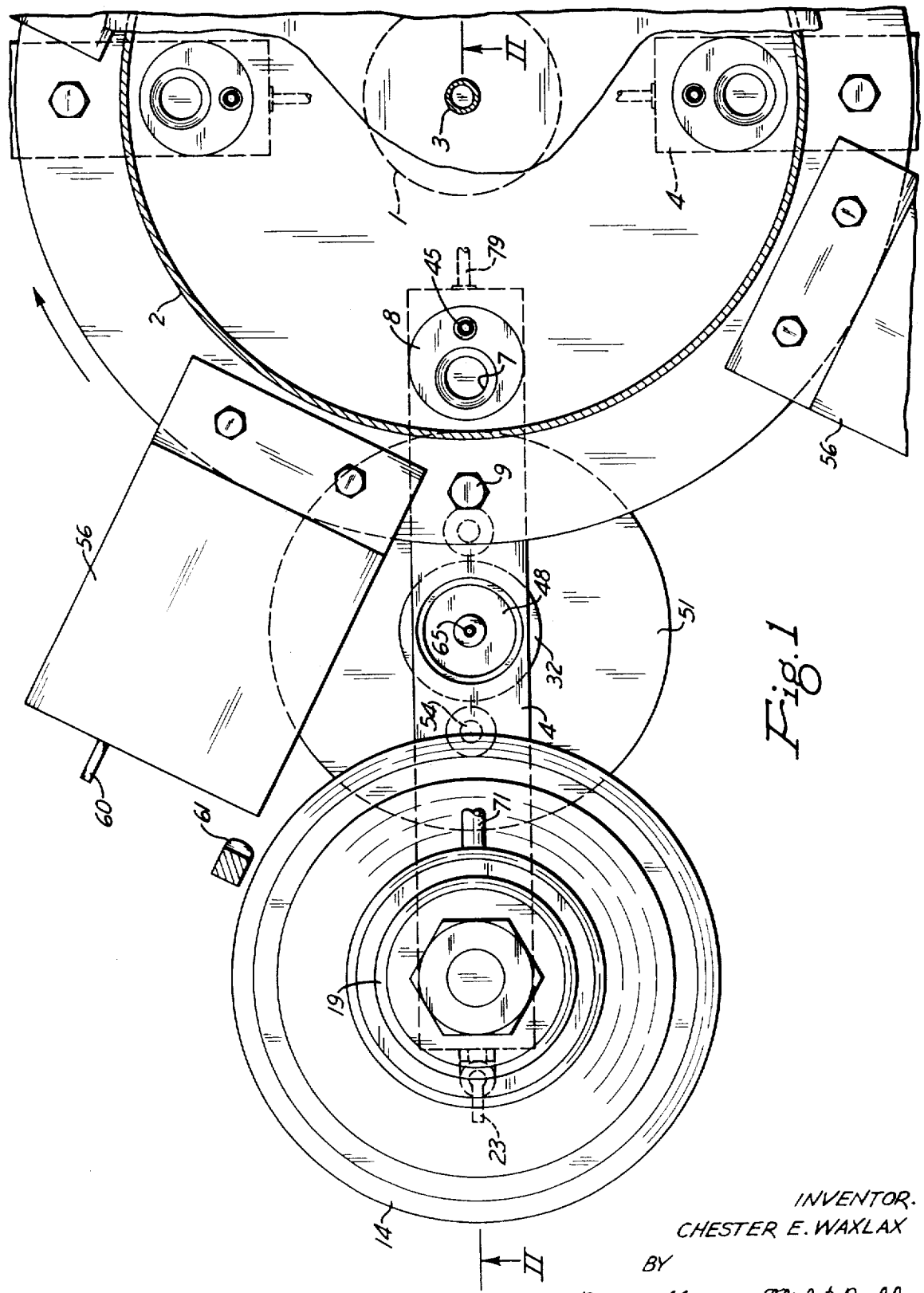
Figure 2:
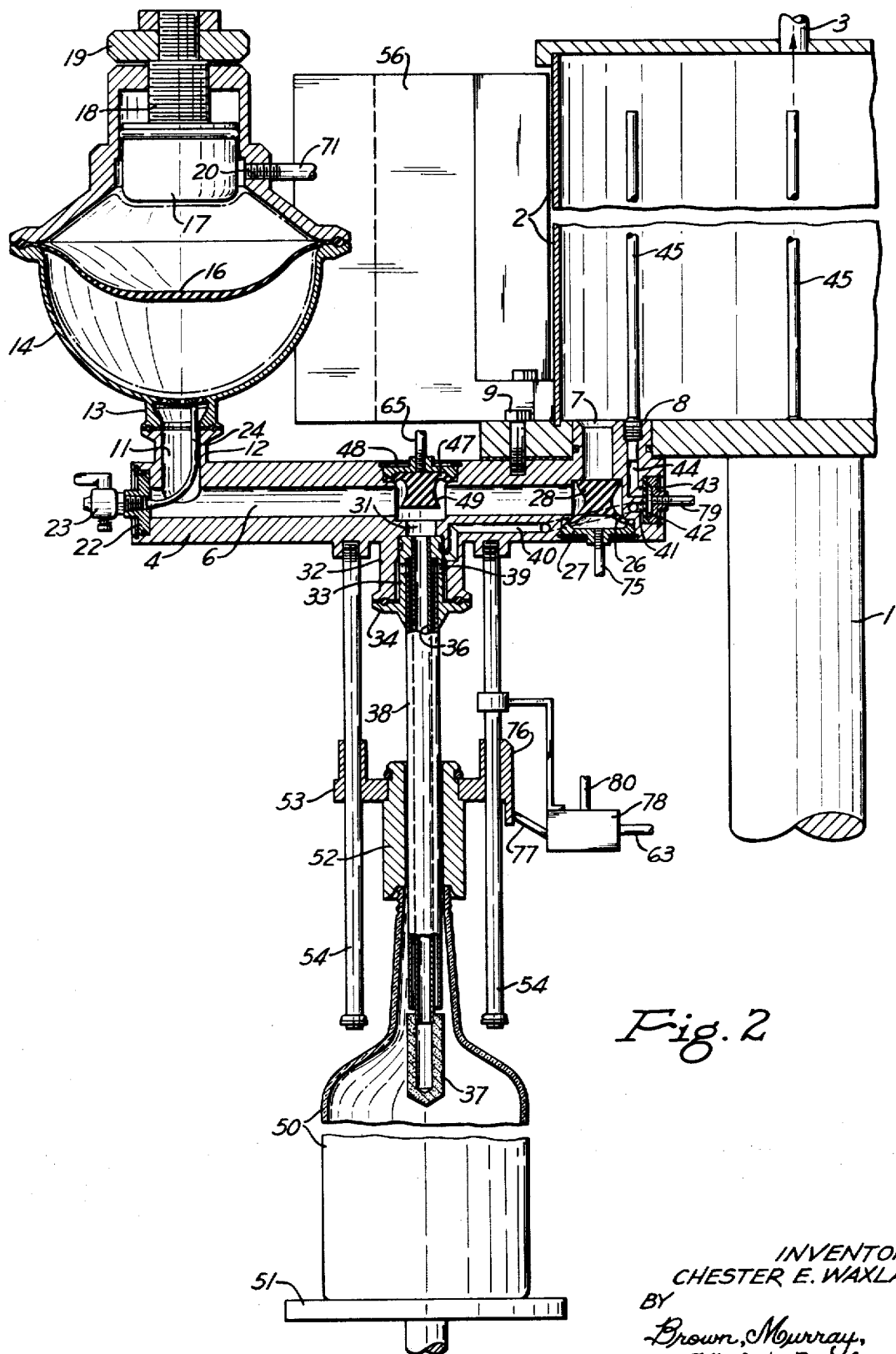

United States Patent

Coffey et al.

[15] 3,700,013
[45] Oct. 24, 1972

[54] PROTECTIVE COATING COMPOSITIONS

[72] Inventors: Charles R. Coffey; Thomas C. Tesdahl, both of Cincinnati, Ohio

[73] Assignee: Chemed Corporation, Cincinnati, Ohio

[22] Filed: Feb. 2, 1971

[21] Appl. No.: 112,047

[52] U.S. Cl. ............106/2, 106/170, 106/191, 106/197, 117/127, 117/134, 117/135
[51] Int. Cl. .............................................C08b 21/26
[58] Field of Search.................106/5–10, 2, 170, 106/191, 197; 117/127, 134, 135

[56] References Cited

UNITED STATES PATENTS

| | | | |
|---|---|---|---|
| 2,687,963 | 8/1954 | Marshall | 106/10 |
| 2,337,939 | 12/1943 | Sermattei | 106/191 |
| 2,356,025 | 8/1944 | Bergamini | 106/173 |
| 2,371,473 | 3/1945 | Sanford | 106/170 |
| 2,737,458 | 3/1956 | Burham | 106/170 |
| 2,776,904 | 1/1957 | Brown | 106/170 |
| 3,353,971 | 11/1967 | Savage | 106/5 |
| 2,809,119 | 10/1957 | Lesser | 106/170 |
| 3,432,319 | 3/1969 | Jakaitis | 106/191 |
| 3,442,676 | 5/1969 | Belfort | 106/191 |
| 3,518,099 | 6/1970 | Holbus | 106/10 |
| 3,539,367 | 11/1970 | Yaroshevich | 106/10 |

*Primary Examiner*—Theodore Morris
*Attorney*—William W. McDowell, Jr. and Kenneth E. Prince

[57] ABSTRACT

An aqueous dispersion is disclosed especially adapted for use as a protective coating composition in food contact areas of food processing plants. The dispersion contains white mineral oil, a hard wax such as carnauba wax, an ethyl cellulose or ethyl hydroxyethyl cellulose having an ethoxyl or combined hydroxyethoxyl-ethoxyl content of 46.0 to 49.5 weight percent and a viscosity of about 4 to 100 centipoises, a higher ($C_{12}$—$C_{22}$) fatty acid, and a volatile basic amine.

15 Claims, 5 Drawing Figures

INVENTOR.
CHESTER E. WAXLAX

INVENTOR.
CHESTER E. WAXLAX
BY
Brown, Murray,
Flick & Peckham
ATTORNEYS.

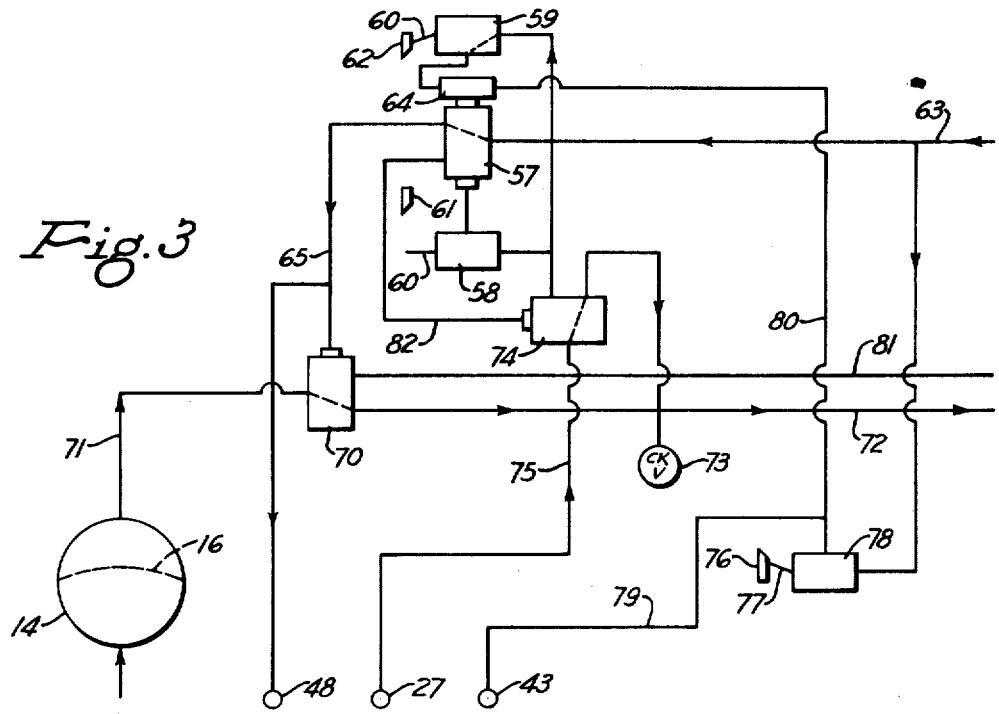
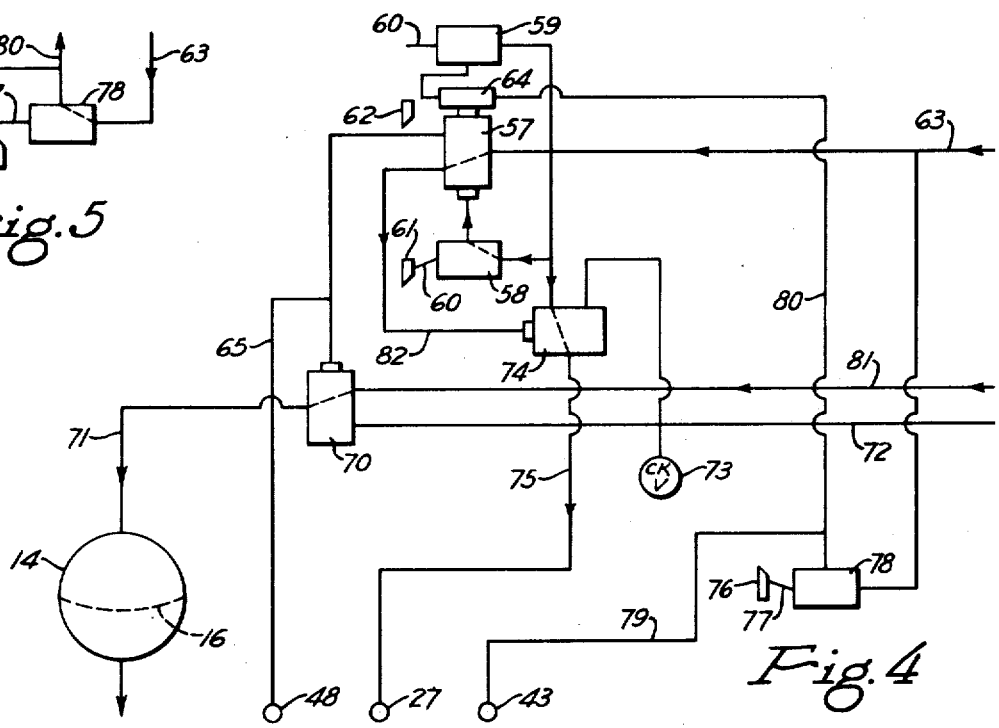

PROTECTIVE COATING COMPOSITIONS

This invention relates to aqueous coating compositions. In particular the invention relates to aqueous dispersions containing mineral oil, a hard wax and an ethyl cellulose and especially adapted for use in coating food contact areas in food processing plants, but not limited to such uses.

Mineral oil, especially white mineral oil (also known as liquid petrolatum) has been widely used in the past as a rust preventative and/or soil release agent in food contact areas of food processing plants. The liquid coating or film of mineral oil on food processing equipment provides reasonably adequate soil release and rust prevention properties. However, the use of mineral oil for these purposes suffers from the serious disadvantage of non-permanence, requiring frequent and repeated application. Nevertheless, mineral oil has achieved virtually universal acceptance in the food processing trade, primarily for the lack of any suitable material with better properties and permanence.

In the search for substitute or improved heat resistant, film-forming, water resistant materials suitable for use in direct contact with food intended for human consumption the obvious primary candidates are natural products such as animal or vegetable waxes, cellulose derivatives and the like. However, serious difficulties are encountered in attempting to form aqueous-based dispersions or "emulsions" of such materials having adequate film-forming properties. Typically such attempts are unsuccessful unless modifiers such as plasticizers, leveling agents, emulsifiers and/or other materials unacceptable or undesirable in food processing plants are incorporated. So-called "hot-melt," organic solvent base and aqueous-base ethylcellulose and/or wax containing compositions suitable for non-food applications are known in the art as exemplified by U.S. Pat. No. 2,337,939 (hot-melt ethyl cellulose-wax paper coating), U.S. Pat. No. 2,356,025 (aqueous emulsion of organic solvent base ethyl cellulose lacquer for textile finishing), U.S. Pat. No. 2,371,473 (hot melt, or organic solvent base rosin ester modified wax compositions which may contain ethyl cellulose, and certain emulsions of the organic solvent solutions, for paper coating or polish applications), U.S. Pat. No. 2,737,458 (aqueous base water repellent coatings for textiles, containing wax, organic solvents, diluents, or various emulsifiers, heavy metal soaps, and polyvinyl alcohol or ethyl cellulose), U.S. Pat. No. 2,776,904 (aqueous dispersions of ethyl cellulose organic solvent lacquer solutions containing nonionic emulsifier plus an ionizable co-emulsifier), U.S. Pat. No. 2,809,119 (aqueous dispersions of ethyl cellulose lacquers), U.S. Pat. No. 3,353,971 (aqueous dispersions of plasticized ethyl cellulose prepared from ethyl cellulose lacquers, optionally blended with separate wax emulsion to form floor or shoe polish compositions), U.S. Pat. No. 3,432,319 (wax emulsions of paraffin waxes with hydroxyalkyl methyl cellulose ether stabilizer for waterproofing coatings), U.S. Pat. No. 3,442,676 (aqueous wax dispersions for coatings and polishes using colloidal sized beta-1, 4-glucan materials as "emulsifier"), U.S. Pat. No. 3,518,099 (car wax "emulsion" containing wax, mineral spirits, cationic emulsifier and specific selected nonionic emulsifiers), U.S. Pat. No. 3,537,990 (aqueous wax "emulsions," using a variety of emulsifiers, for flocculating agents) and U.S. Pat. No. 3,539,367 (wax emulsions using cationic high molecular weight amine salt emulsifiers plus low molecular weight amine modifier).

It is an object of this invention to provide novel, sprayable aqueous film forming wax and ethyl cellulose compositions containing only food grade ingredients.

Another object of the invention is to provide novel sprayable aqueous coating compositions useful for forming durable, waxy, adherent, pliable, heat and water resistant, self-repairing soil releasing coatings on food processing equipment.

Still another object of the invention is to provide a method for preparing aqueous wax and ethyl cellulose containing dispersions.

Still further objects and the many advantages of the invention will be apparent from the following more detailed description.

In summary, the coating compositions of this invention consist essentially of an oil-in-water dispersion of white mineral oil, a hard wax, an ethyl cellulose or ethyl hydroxyethyl cellulose, a higher fatty acid, and a basic amine in a water vehicle.

The method for forming such coating compositions comprises (1) heating a blend of white mineral oil, a hard wax, an ethyl cellulose or ethyl hydroxyethyl cellulose and a higher fatty acid at a temperature sufficient to form a hot melt and for a period of time sufficient to dissolve the ethyl cellulose in the hot melt, (2) then slowly adding the melt from step (1) to vigorously agitated water preheated to a temperature of about 200° to 210° F., and (3) cooling the resulting oil-in-water dispersion to below about 100° F. while maintaining mild agitation. The volatile basic amine ingredient is added to the hot melt or to the water vehicle, prior to the formation of the oil-in-water dispersion.

While a number of wax and ethyl cellulose compositions have been suggested in the representative prior art cited above, the present inventors believe that they are the first to discover that a melt containing wax and ethyl cellulose can be dispersed into water to form an oil-in-water emulsion containing only ingredients acceptable for food contact applications and, in particular without the need for an organic solvent to dissolve and/or disperse the cellulose ether.

The coating compositions of this invention have the following composition:

| Ingredient | Weight Percent Operable | Preferred |
|---|---|---|
| White mineral oil | 2–20 | 10–15 |
| Hard wax | 2–20 | 5–10 |
| Ethyl or ethylhydroxyethyl cellulose | 0.5–10 | 1–4 |
| Higher fatty acid | 1–10 | 3–6 |
| Basic amine | to pH of 8.0 to 10.0 (generally 2–8%) | sufficient to provide pH of about 9.0 (generally 4–6%) |
| Water | Balance | Balance |

The mineral oil ingredient used in these compositions is that generally known as white mineral oil (also sometimes synonymously as liquid petrolatum). It will be recognized by those skilled in the art that this material is the product resulting from distillation of high boiling (330°–390° C.) petroleum fractions and purification to remove color, waxes and other impurities. The product is a colorless, transparent, almost tasteless oily liquid having a specific gravity of 0.88 to 0.94 and most typically about 0.88–0.89. The preferred white mineral oil for use in the compositions of this invention is that commercially sold as N.F. grade (i.e., National Formulary grade acceptable for food contact uses). As noted the white mineral oil ingredient constitutes from about 2 to about 20 weight percent of the total coating composition and preferably from about 10 to about 15 (e.g., 12) weight percent.

The wax ingredient of the present coating compositions may be of a natural or synthetic origin. In any event the wax must be a hard wax, i.e., a wax or blend of waxes having a normal melting point of at least about 75° C. The preferred wax is carnauba wax or a blend of carnauba wax with one or more other natural or synthetic waxes such as beeswax, candelilla, ceresin, montan, rice bran, ouricury, ozocerite, sugarcane, esparto, paraffin, microcrystalline paraffin and other like waxes, preferably a wax or waxes acceptable for food contact uses. The hard wax ingredient constitutes from about 2 to about 20 weight percent, preferably about 5 to about 10 (e.g., 8) weight percent of the total composition.

The weight ratio of mineral oil to wax is an important factor in the compositions of this invention. This ratio is usually from about 0.75 to about 2.25 and, preferably is from about 1.10 to about 2.0, e.g., about 1.5. At lower oil to wax ratios difficulties are experienced in spraying uniform coatings and the dried film is more brittle than desired. At higher ratios the emulsion quality is poor and coatings deposited therefrom are found to be softer and less water resistant than desired.

The ethyl or ethylhydroxyethyl cellulose ether ingredient used in the compositions of this invention must have an ethoxyl or combined ethoxyl and hydroxyethoxyl content of from about 46.0 to about 49.5 weight percent. Preferably the cellulose ether ingredient is ethylcellulose having an ethoxyl content of from about 47.5 to about 49 weight percent. The cellulose ether ingredient in the compositions of this invention must further have a viscosity of from 4 to 100 and, preferably about 7 to 50 (e.g., 10) centipoises at 25° C. as determined on 5 weight percent solutions of the cellulose ether in an 80:20 weight percent toluene-ethyl alcohol solvent. These ingredients and methods for their preparation are known in the art as exemplified by Kirk-Othmer's Encyclopedia of Chemical Technology, Second Edition, Volume 4 (1964) at pages 638–650. The cellulose ether constitutes from about 0.5 to about 10, preferably about 1 to about 4 (e.g., 2) weight percent of the total composition.

The compositions of this invention also include a higher fatty acid, that is, an aliphatic monocarboxylic acid having from about 12 to about 22 carbon atoms. The fatty acid may be a saturated acid such a lauric, myristic, palmitic, margaric, stearic, arachidic or behenic; or an unsaturated acid such as oleic, elaidic, linoleic, alpha or beta-eleostearic, or linolenic. For food processing applications the acid must, of course, be food-grade. Preferably the fatty acid ingredient is food-grade oleic acid. The oleic acid or other aliphatic monocarboxylic acid ingredient is included in amounts ranging from about 1 to about 10 weight percent, preferably about 3 to about 6 (e.g., 4) weight percent of the total aqueous coating composition.

The volatile basic amine used in the compositions in order to neutralize the acids in the melt and to adjust the final pH may be any suitable primary, secondary or tertiary amine such as methylamine, ethylamine, propylamine, butylamine, morpholine; mono-, di-or triethanolamine; cyclohexylamine, n-octylamine, dimethylamine, diethylamine, trimethylamine and the like, or mixtures of such amines. By "volatile" we mean an amine which will evaporate from the film during drying to leave a free acid film.

The amine is present in the composition in amounts to provide a pH of from about 8.0 to about 10.0, preferably about 9.0. The specific amount required for this purpose will vary depending upon the identity and concentration of other ingredients in the composition and the specific basic amine or amines used. For food contact uses only a few of the volatile amines are acceptable. Morpholine, i.e., the heterocyclic amine

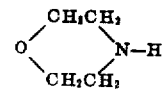

is the presently preferred amine. Usually 4 to 6 weight percent of morpholine based on total weight of the composition will be sufficient to provide the desired pH.

The invention is illustrated by the following representative non-limiting examples.

EXAMPLE 1

| Ingredient | Weight Percent |
| --- | --- |
| (1) White mineral oil | 12 |
| (2) Carnauba wax | 8 |
| (3) N-type[1] ethylcellulose (viscosity of 10 centipoises) | 2 |
| (4) Oleic acid-food-grade | 4 |
| (5) Morpholine | 4 |
| (6) Water | 70 |

[1]Standard commercial ethyl cellulose having an ethoxyl content of 47.5 to 49.0 weight percent. Viscosities are determined in centipoises at 25° Centigrade on 5 weight percent solutions in 80:20 toluene-ethanol solvent.

The first four ingredients of the foregoing formulation are heated at about 280° to 300° F. until the ethyl cellulose is solubilized. Typically this will take about 2 hours or so. The resulting melt is then cooled to about 250° F. and the morpholine is slowly added and uniformly blended in for an additional 4 or 5 minutes. The water is separately preheated to about 205° F. and the melt of the remaining ingredients is slowly added to the hot water with good agitation. After all of the melt has been added to the water the dispersion is cooled to room temperature, while continuing mild agitation until the dispersion has reached a temperature of about 100° F. and below.

The resulting product is a substantially homogeneous dispersion of fine particles of the solidified mineral oil, wax, ethylcellulose and oleic acid melt solution in a continuous external water phase. The dispersion has a viscosity of about 100 centipoises, is storage stable, and can be applied as is or after further dilution with water to a variety of metallic and non-metallic substrates by customary spray techniques or by brush or dip coating. Preferably the dispersion will be applied in undiluted form. The applied coatings or films dry in air at ambient conditions in a matter of several hours or so to form non-reversible, adherent, waxy, pliable, self-repairing heat and water resistant, soil-releasing coatings. A thin coat, e.g., about 2 mils (0.002 inches), will normally dry in 3 to 4 hours in ambient air at typical temperatures (e.g., 65°–80° F.) and humidity (e.g., 40°–60 percent relative humidity).

Field trials have shown that coatings deposited from the novel aqueous dispersion of this Example exhibit excellent adhesion to metallic and non-metallic surfaces. Coatings deposited directly from a hot melt of the same or similar mineral oil/wax/ethyl cellulose content do not adhere well to metal substrate surfaces.

It has been observed in use that the best adhesion of the compositions of this invention to a substrate results when the substrate surface is carefully cleaned prior to the first coating application.

Coatings prepared from the dispersion of this invention exhibit outstanding inhibition of soil deposition and of retention of deposited soils. When the composition of this Example was employed as a surface coating for ceramic walls in animal slaughter areas it was observed that accumulation of blood and fats on the walls was inhibited. In addition there was a definite improvement in the ability to clean the coated walls with customary water flushing and foam cleaning. Like results were observed when the composition was employed to form coatings on food contact surfaces of food processing equipment having galvanized, plain steel, or stainless steel surfaces. In addition to inhibiting the deposition of blood and fats the coating inhibited the deposition of hard water scale on the equipment surfaces. Moreover the coating provides a definite improvement in inhibition of rusting of these metallic surfaces.

Coatings formed from the dispersion of this Example inhibited adhesion of soil and/or stain deposits from potato starch, corn slurries, fruits, and vegetable juices on surfaces of stainless steel and polyvinyl chloride processing equipment in contact therewith. The bulk of any soils which were deposited was removed by a plain water rinse, thus reducing detergent requirements and facilitating the subsequent final detergent cleaning step prior to re-use of the equipment.

Coatings formed from the dispersion of this Example are excellent rust preventive and/or corrosion resistant films for various metal surfaces exposed to an air, moisture, acid or salt containing environment. Of particular importance in the food processing industry is the fact that any rust coating subsequently formed is underneath the coating and not transferable to food products in contact with the coated surface.

The coatings of this invention are capable of withstanding several cleaning cycles with mild alkaline and/or mild acid cleaning compositions depending upon the conditions and mode of application. Tests have shown that the time required to effectively clean food processing equipment coated with the coatings of this invention is significantly less than that for uncoated equipment in every case. In many instances the reduction in cleaning time is as much as 50 percent. It has also been observed that the cleaning agents used for cleaning the coated surfaces are not required to be as strong as those required for cleaning the same surfaces without a coating.

Bacteriological tests of the coating of this Example indicate that it does not, by itself, support or enhance the growth of commonly occurring bacteria.

In the bacteriological tests, ten sterile plastic Petri dishes were prepared for each test organism by pipetting 2–3 milliliters of the emulsion of this Example into each dish. The dishes were swirled until the inside bottom surfaces were entirely coated, then the excess emulsion was pipetted off and discarded. The treated plates were dried in an oven at 75° C. for about 1 hour and then cooled. Ten milliliters of a diluted suspension of the respective test organism was placed in each of the 10 treated dishes and carefully swirled to cover the coated portion of the dish. After 3 minutes, the excess liquid was pipetted off and discarded. Five of the plates were immediately poured with an appropriate agar and incubated. The other five plates were allowed to dry and were incubated for 24 hours without agar. Thioglycollate agar was used for Staphylococcus aureus, Salmonella typhosa, and Saccharomyces cerevisiae. Mycophil agar with lecithin and tween 80 added was used to culture Aspergillus niger. S. aureus and Sal. typhosa were incubated at 37° C., while A. niger and S. cerevisiae were incubated at room temperature. The number of micro-organisms in each plate was determined after 24 hours of incubation by microscopic determination. The results (average counts for the five test plates in each series) were as follows:

Average Number of Organisms per Plate After 25 Hours

| Organism | Control | Coated Plates Without Agar |
|---|---|---|
| S. aureus | 84 | 0.4 |
| Sal. typhosa | 51.5 | 0.2 |
| S. cerevisiae | 150 | 4.8 |
| A. niger | 226 | 64.2 |

Other tests have shown that the oil-in-water dispersion as such will not enhance or support the growth of any of the four test organisms mentioned above over test periods of up to 7 days. Complete results are summarized as follows:

| Organism | Inoculum Concentration Organisms per Milliliter | Number of Surviving Organisms per Milliliter | | | |
|---|---|---|---|---|---|
| | | 24 hours | 48 hours | 48 hours | 7 days |
| S. aureus | $5.24 \times 10^7$ | 0 | 0 | 0 | 0 |
| Sal. typhosa | $4.45 \times 10^7$ | 0 | 0 | 0 | 0 |
| S. cerevisiae | $9.70 \times 10^6$ | 0 | 0 | 0 | 0 |
| A. niger | $4.28 \times 10^6$ | 0 | 0 | 0 | 0 |

EXAMPLE 2

An oil-in-water dispersion was prepared in the manner and with composition identical to that described in Example 1, except for the substitution of an N-type ethyl cellulose having a viscosity of 50 centipoises. The resultant dispersion had a viscosity of about 300 centipoises.

In comparison another identical dispersion, except for the inclusion of 2 parts of a commercially available T-type ethylcellulose (ethoxyl content greater than 49.5 percent) and a viscosity of 10 centipoises gave an oil-in-water dispersion product having a viscosity of 500 centipoises — too viscous for desired spray-type applications.

COMPARATIVE EXAMPLES A AND B

Dispersions of the following formulas were prepared in the manner described in Example 1 to determine the effect of oil to wax ratio:

| Formula | A | B |
| --- | --- | --- |
| White mineral oil | 4 | 20 |
| Carnauba wax | 8 | 8 |
| N-10 ethyl cellulose | 2 | 2 |
| Oleic acid | 4 | 4 |
| Morpholine | 4 | 4 |
| Water | 78 | 62 |
| Oil to wax weight ratio | 0.5 | 2.5 |
| Results | | |
| Emulsion viscosity, centipoises | 25 | 280 |
| Emulsion quality | Fair | Poor |
| Emulsion coating (as applied) | Poor, uneven | Good, but heavier than desired |
| Dried film coating | Brittle, poor adhesion | Soft, not as resistant as Example 1 |

What is claimed is:

1. A composition useful for formation of air-dried coatings consisting essentially of
   1. about 2 to about 20 weight percent white mineral oil;
   2. about 2 to about 20 weight percent of hard wax having a melting point of at least about 75° C. and consisting essentially of carnaube wax;
   3. 3. 0.5 to about 10 weight percent of a cellulose ether selected from the members of the group consisting of ethyl cellulose, ethylhydroxyethyl cellulose and mixtures thereof having an ethoxy or combined ethoxy and hydroxyethoxy content of from about 46.0 to about 49.5 weight percent and a viscosity of from about 40 to about 100 centipoises;
   4. about 1 to about 10 weight percent of an aliphatic monocarboxylic higher fatty acid having about 12 to about 22 carbon atoms;
   5. about 2 to about 8 weight percent of a volatile basic amine, sufficient to provide a pH of from about 8.0 to about 10.0, said amine selected from the group consisting of methylamine, ethylamine, propylamine, butylamine, morpholine; mono, di- or triethanolamine; cyclohexylamine, n-octylamine, dimethylamine, diethylamine, trimethylamine and mixtures of such amines; and
   6. the balance water in which said ingredients (1) through (5) are substantially homogeneously dispersed in the water to prove an oil-in-water type aqueous dispersion, 2. Composition as defined in claim 1 in which the amount of the ingredients (1) through (5) is from about 10 to about 15 percent, from about 5 to about 10 percent, from about 1 to about 4 percent, from about 3 to about 6 percent and from about 4 to about 6 percent, respectively.

3. A composition as defined in claim 2 in which the wax is carnauba wax.

4. A composition as defined in claim 2 wherein the cellulose ether is ethyl cellulose having an ethoxy content of from about 47.5 to about 49.0 weight percent and a viscosity of from about 7 to about 14 centipoises.

5. Composition as defined in claim 1 in which there is about 12 weight percent white mineral oil, about 8 weight percent carnauba wax, about 2 weight percent of ethyl cellulose having a viscosity of about 10 centipoises, about 4 weight percent of food-grade oleic acid, about 4 weight percent morpholine and about 70 weight percent water.

6. A coating comprising the air dried residue of the composition of claim 1.

7. A coating comprising the air dried residue of the composition of claim 2.

8. A coating comprising the air dried residue of the composition of claim 5.

9. A ceramic, metal, or rigid thermoplastic surface in a food processing plant having on its food contacting surfaces a coating as defined in claim 6.

10. A ceramic, metal, or rigid thermoplastic surface in a food processing plant having on its food contacting surfaces a coating as defined in claim 7.

11. A ceramic, metal, or rigid thermoplastic surface in a food processing plant having on its food contacting surfaces a coating as defined in claim 8.

12. A method for inhibiting the deposition of food origin soils or stains on food processing equipment or facilities and/or enhancing the removal of such soils or stains which comprises coating the said equipment or facilities with a coating as defined in claim 6.

13. A method for inhibiting the deposition of food origin soils or stains on food processing equipment or facilities and/or enhancing the removal of such soils or stains which comprises coating the said equipment or facilities with a as as defined in claim 7.

14. A method for inhibiting the deposition of food origin soil or stains on food processing equipment or facilities and/or enhancing the removal of such soil or stains which comprises coating the said equipment or facilities with a coating as defined in claim 8.

15. Method comprising:
   1. heating a blend of 2 to 20 parts of mineral oil, 2 to 20 parts of hard wax to provide an oil to wax ratio of about 0.75 to about 2.25, 0.5 to 10 parts of a cellulose ether selected from the members of the group consisting of ethyl cellulose, ethylhydroxyethyl cellulose and mixtures thereof having an ethoxy or combined ethoxy and hydroxyethoxy content of from about 47.5 to about 49.5 weight percent and a viscosity of from about 4 to about 100 centipoises and 1 to 10 parts of a $C_{12}$ to $C_{22}$ monocarboxylic fatty acid at a temperature sufficient to form a hot melt and for a time sufficient to dissolve the cellulose ether in the melt, said hard wax having a melting point of at least about 75° C. and consisting essentially of carnauba wax;

2. slowly adding the melt from step (1 to vigorously agitated water preheated to about 200° to 210° F. in the presence of 2 to 8 parts of a volatile basic amine, said amine selected from the group consisting of methylamine, ethylamine, propylamine, butylamine, morpholine; mono-, di- or triethanolamine; cyclohexylamine, n-octylamine, dimethylamine, diethylamine, triethylamine and mixtures of such amines; and 3. cooling the resulting oil-in-water dispersion to below about 100° F. while maintaining mild agitation.

* * * * *

UNITED STATES PATENT OFFICE
CERTIFICATE OF CORRECTION

Patent No. 3,700,013      Dated July 14, 1972

Inventor(s) Charles R. Coffey, et. al.

It is certified that error appears in the above-identified patent and that said Letters Patent are hereby corrected as shown below:

The 3 sheets of drawing and the illustrative drawing on the cover sheet should be canceled.

Signed and sealed this 8th day of May 1973.

(SEAL)
Attest:

EDWARD M. FLETCHER, JR.
Attesting Officer

ROBERT GOTTSCHALK
Commissioner of Patents